No. 728,070. PATENTED MAY 12, 1903.
O. ZWIETUSCH.
COLLECTION AND UTILIZATION OF CARBONIC ACID GAS PRODUCED BY FERMENTATION IN BREWERIES.
APPLICATION FILED DEC. 4, 1899.

NO MODEL. 3 SHEETS—SHEET 1.

No. 728,070. PATENTED MAY 12, 1903.
O. ZWIETUSCH.
COLLECTION AND UTILIZATION OF CARBONIC ACID GAS PRODUCED BY FERMENTATION IN BREWERIES.
APPLICATION FILED DEC. 4, 1899.

NO MODEL. 3 SHEETS—SHEET 2.

Witnesses:
Geo. N. Young.
B. C. Roloff.

Inventor
Otto Zwietusch,
By H. G. Underwood
C. Worney

No. 728,070. PATENTED MAY 12, 1903.
O. ZWIETUSCH.
COLLECTION AND UTILIZATION OF CARBONIC ACID GAS PRODUCED
BY FERMENTATION IN BREWERIES.
APPLICATION FILED DEC. 4, 1899.

NO MODEL. 3 SHEETS—SHEET 3.

Witnesses:
Inventor
Otto Zwietusch
By H. G. Underwood
Attorney

No. 728,070. Patented May 12, 1903.

UNITED STATES PATENT OFFICE.

OTTO ZWIETUSCH, OF MILWAUKEE, WISCONSIN.

COLLECTION AND UTILIZATION OF CARBONIC-ACID GAS PRODUCED BY FERMENTATION IN BREWERIES.

SPECIFICATION forming part of Letters Patent No. 728,070, dated May 12, 1903.

Application filed December 4, 1899. Serial No. 739,065. (No model.)

*To all whom it may concern:*

Be it known that I, OTTO ZWIETUSCH, a citizen of the United States, and a resident of Milwaukee, in the county of Milwaukee and State of Wisconsin, have invented certain new and useful Improvements in the Collection and Utilization of Carbonic-Acid Gas Produced by Fermentation in Breweries; and I do hereby declare that the following is a full, clear, and exact description thereof.

My invention relates to the collection of carbonic-acid gas arising from fermentation in breweries and the carbonation of the beer with its self-produced gas, as well as the use of the gas as a compelling pressure in place of air, whereby the finished beer never comes in contact with air; and to these ends my said invention consists in certain peculiarities in the construction and arrangement of the apparatus employed in the described art of collecting and utilizing the said gas for the accomplishment of the desired results, all being combined into a novel system, as will be more fully set forth hereinafter and subsequently claimed.

Figure 1:
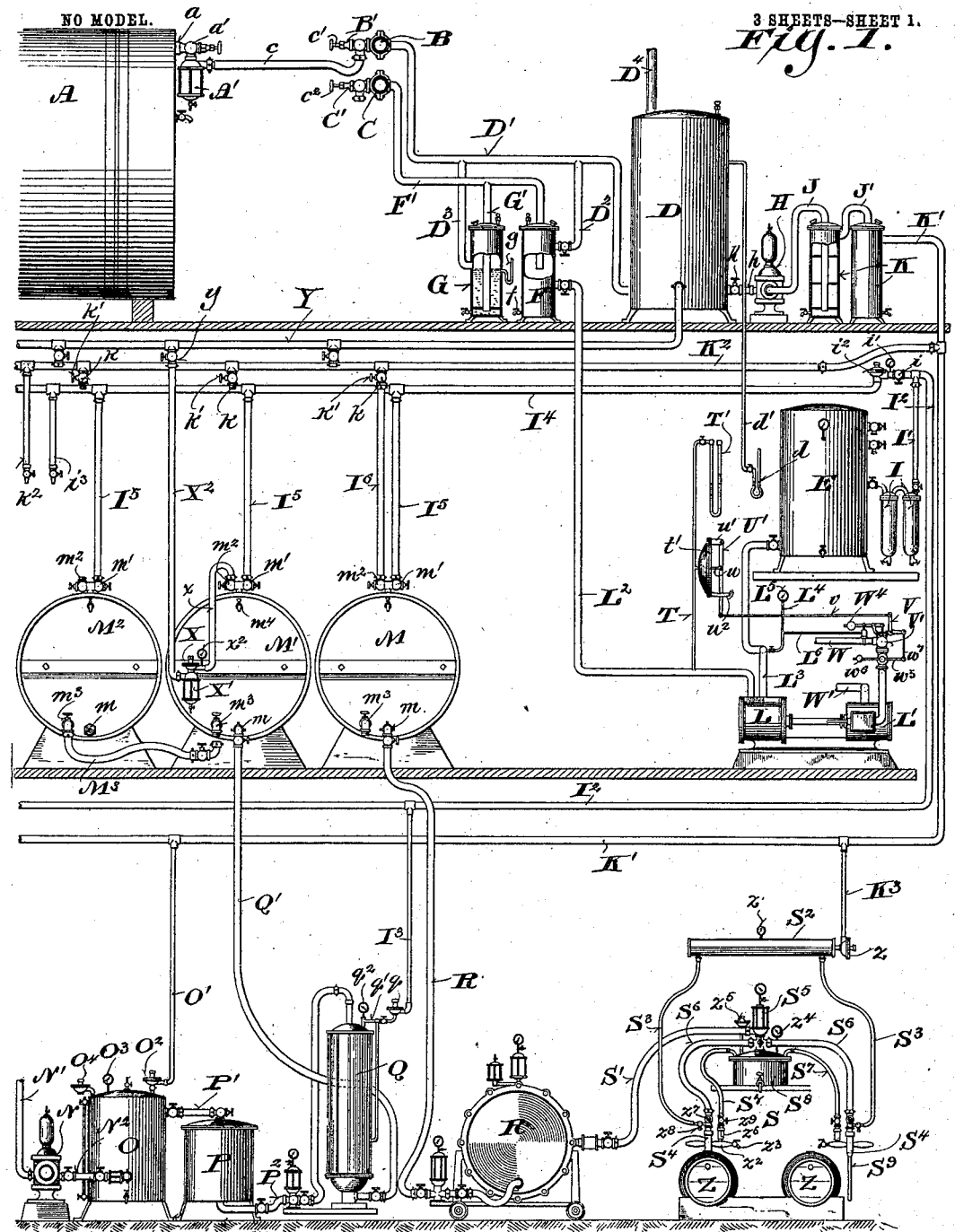
Figure 2:
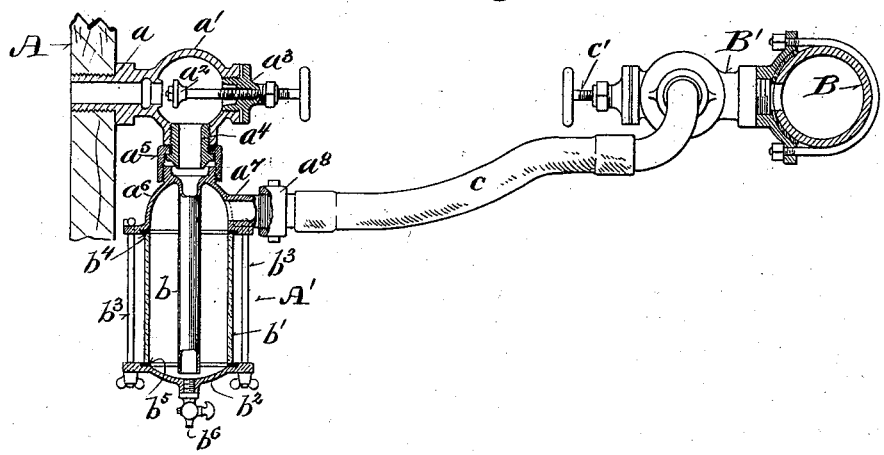
Figure 3:
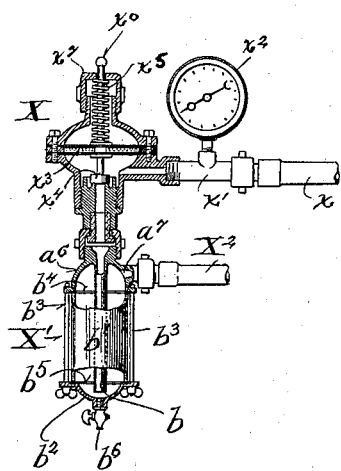
Figures 4, 5:
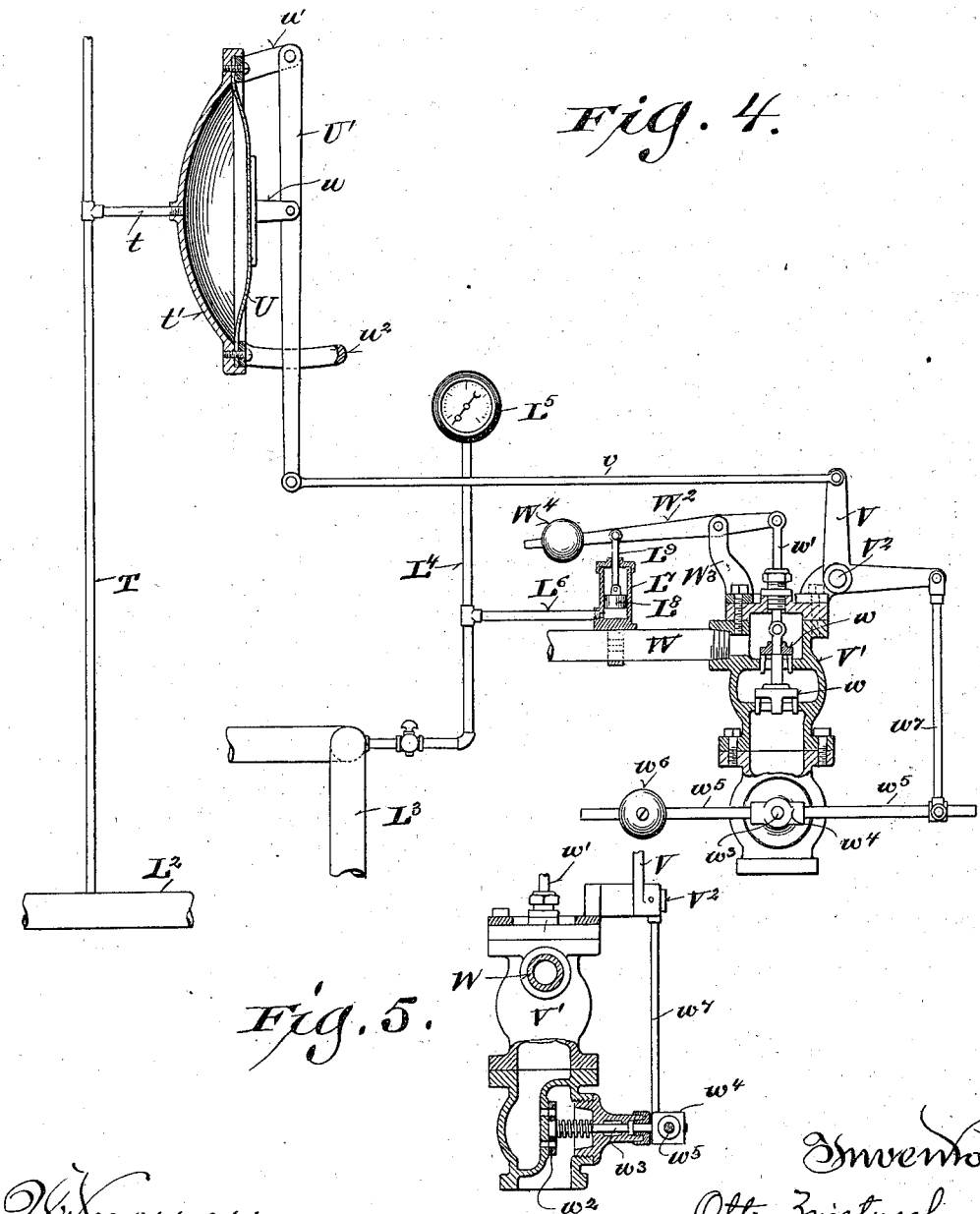

In the drawings, Figure 1 is a representation in elevation of the apparatus employed in my present system, showing the preferred arrangement thereof, certain portions of said apparatus being shown broken away or in section. Figs. 2 to 5 are enlarged detail views in elevation and section of portions of said apparatus, Fig. 2 illustrating the valve-controlled gas-outlet pipe leading from the closed fermenting-cask with the connected fermentation-observation device and the flexible hose connecting said outlet-pipe with one or the other of the gas-collecting pipes, Fig. 3 illustrating the details of construction of the blow-off regulator and suspended observation device connected with the bunging apparatus, Fig. 4 illustrating the details of construction of the valve and connecting parts employed on the operation of the clear-gas compressor and the connected low-pressure indicator and yielding flexible diaphragm, and Fig. 5 is another detail view of said valve.

In a plant for the collection of the carbonic-acid gas from the fermentation in breweries closed fermenting vessels, preferably arranged in a series, are required. After the wort has been cooled it is stocked with yeast, usually in a large open vat. After the fermentation has set in lively the wort is transferred into closed fermenting vessels, in which the fermentation produces a pressure. It is necessary to collect the gas under as light a pressure as possible and as fast as it is produced. In the beginning of the fermentation there is quite a large quantity of air mixed with the gas, and clear gas is obtained only after a period of fermentation according to its progress—say from one to two days. Whenever the carbonic-acid gas is collected, this mixed gas is expelled and formerly was wasted until the clear gas was obtained. In my system I have arranged to use this mixed gas for a compelling pressure, substituting it for the regular air-pressure common in breweries where it is advisable, for instance, for racking off the beer, filling empty casks which are to be filled with carbonated beer, or for a counter pressure for forcing the air out of such casks. The method I have adopted in my entire system includes filling all casks into which the carbonated beer is brought with carbonic-acid gas or forcing the atmospheric air out with gas before they are filled with beer to avoid all contact of beer with the air, by which method the beer produced is made a better article. As in the first part of the fermentation a rich aroma is mingled with the gas, I adopt two leading systems, one for the clear gas, the other for the mixed. This clear gas is led by suction of the gas-compressor into a strong reservoir at a pressure of from seventy-five to one hundred pounds. From this reservoir the gas is passed through a purifier and used as a carbonating pressure for still-beer. The other system carries the mixed gas to a separate reservoir, of which the compelling pressure is obtained by a regular air-pump, leading this pressure through the entire brewery wherever it is required—for instance, for racking off the finished beer and filling the empty vessels with gas before they are supplied with the carbonated beer. By a continuous reuse of the waste gas, carrying it to the supply of the compelling pressure, and the economical reuse of the waste gas as a compelling pressure the system is supplied almost entirely with gas, which will grow more pure as the operation continues, and surplus of clear gas is also let into the compelling-pressure system.

Referring to the drawings, A represents one of the closed fermenting-casks containing the wort to which the stock-yeast has been added ready for fermentation. B C represent two gas-collecting pipes suspended or supported in any suitable manner in line with the upper portions of the said closed fermenting-casks A, of which casks there may be any required number, according to the capacity of the brewery, the pipe B being for the collection of the first produced or mixed gas (containing some air) from the casks A and the pipe C for the collection of the later produced clear gas from said casks. D is a reservoir for the said mixed gas, (which is to be used as a compelling pressure,) and E is a reservoir for the clear gas.

F is a gas-supply tank for the clear gas, and G is what I term a "safety and overpressure escape vessel."

H is a pump for the compelling pressure, and K K a purifier for the compelling-pressure gas, while I I represent a purifier for the clear gas, and L a compressor for said clear gas.

M M' M² designate a row of casks operated as a bunging apparatus, N a beer-supply pump, O an intermediate beer-supply vessel, P a beer-filter, Q a beer-carbonator, R the final filter, and S a counter-pressure racking aparatus, all as will be more fully described hereinafter.

In the upper part of each closed fermenting-cask A is inserted a gas-outflow pipe $a$, formed with a valve-casing $a'$ and carrying a valve $a^2$, whose screw-threaded stem passes through a suitably-packed bushing $a^3$ in the outer end of said casing and terminates in a hand-wheel for the operation of the valve. Another bushing $a^4$ is screwed into the bottom of said casing, and from an annular flange of this last-named bushing there is suspended a coupling $a^5$, to which is secured the fermentation-observation device A', all of these parts being shown in detail in Fig. 2. The upper part of this device comprises a metal cap $a^6$, screwing into and suspended from the said coupling $a^5$ and having a gas-outlet $a^7$ and a central depending pipe $b$ in line with the bore of the bushing $a^4$. The said device has a concave base-plate $b^2$ and a transparent wall $b'$, (preferably a glass cylinder,) clamped between the cap and base-plate by a series of clamping-rods $b^3$ $b^3$ and suitably packed, as shown at $b^4$ $b^5$, the pipe $b$ preferably extending slightly below the bottom plane of the transparent wall $b'$ into the concavity of the base-plate, which latter has a valve-controlled fluid-outlet $b^6$, it being designed that the space between the pipe $b$ and wall $b'$ should be filled with water. The gas-outlet $a^7$ is connected by a coupling $a^8$ with a flexible hose $c$, whose other end is adapted to be connected with the gas-inlet pipe B' of pipe B or the gas-inlet pipe C' of pipe C, the said inlet-pipes having valves $c'$ $c^2$ to control the admission of gas into the pipes B C. From the pipe B a pipe D' leads directly into the reservoir D, said pipe D' having two branches, one of which, D², is connected to the tank F, and the other branch D³ is connected to the vessel G. From the pipe C a pipe F' leads directly to and within the tank F, and there being a pipe G' extending from near the bottom of the vessel G up through said vessel and connecting with the said pipe F'. The reservoir D is provided with an extended high pipe D⁴ to the open air and with a glass gravity-indicator $d$ at the end of a pipe $d'$. The vessel G is filled with water to a certain height, and to prevent that height being exceeded (as would otherwise sometimes happen from the condensation and moisture of the gas) the said vessel G is provided with a bent overflow-pipe $g$, open at its outer end, for the escape of such extra water. From the reservoir D a pipe $h$ (provided with a cock $h'$) runs to the pump H, from which pump a pipe J extends to and within the first of the purifying vessels K K, (which are connected by a similar pipe J',) and from the said purifier K K there extends a pipe K', carrying the gas from the reservoir D after it leaves the purifier K K to the desired points, as hereinafter explained, there being another pipe K², leading from pipe K', and branches on both pipes, subsequently named.

L, as hereinbefore stated, designates a compressor for the clear gas, which is operated by steam-power, so much of a steam-engine as is necessary to the understanding of the operation of my invention being represented at L' in Fig. 1 and the valves and connecting parts herein utilized, as hereinafter explained, being shown in enlarged detail views, Figs. 4 and 5. A suction-pipe L² connects the gas-supply tank F with the compressor L, and from the latter a pipe L³ extends to the reservoir E. Rising from the pipe L² and connected therewith is a pipe T, terminating in a double liquid column T', which forms a low-pressure indicator. The pipe T is connected by a short branch pipe $t$ with a rigid concave shell $t'$, provided with a yielding flexible disk or diaphragm U, which in turn is connected by a link $u$ to a lever U', one end of this lever being connected by a link $u'$ to the shell of the diaphragm, while the opposed edge of the shell is provided with a slotted guide $u^2$, within whose slot the said lever U' has movement, and the adjacent end of this lever is linked by a connecting-rod $v$ to one arm of a bell-crank lever V, which is pivotally supported on an arbor V², projecting from the adjacent valve-casing V' of the engine.

W represents the steam-supply pipe entering the valve-casing V', which latter communicates with the steam-chests of the engine, as indicated in Fig. 1, wherein W' indicates the exhaust. This casing contains an upper double-seat valve $w$ $w$ on a vertical rod or stem $w'$, passing up through a stuffing-box, and a lower rotary valve $w^2$ on a horizontal rod or stem $w^3$, which passes through a block $w^4$, said block having screw-threaded hubs at each side thereof to receive the adjacent ends of a divided rod $w^5$ $w^5$. One part of this rod $w^5$ carries a weight $w^6$, while the other part is connected to the lower end of a link $w^7$, whose upper end is pivotally connected to the lower arm of the described bell-crank lever V. A pipe $L^4$ is connected to and rises from the pipe $L^3$ and at its top carries a pressure-gage $L^5$, while a branch pipe $L^6$ extends from the pipe $L^4$ to a cylinder $L^7$, supported on the steam-supply pipe W, this cylinder having a piston $L^8$ within the same, the piston-rod $L^9$ having a link connection with the piston and with a rod $W^2$, which latter is pivoted to a fulcrum $W^3$, rising from the valve-casing $V'$, the inner end of this rod $W^2$ being pivotally connected to the upper end of the valve-rod $W'$ and the free outer end of said rod $W^2$ carrying a weight $W^4$.

As it is one of the main conditions to the successful operation of my invention that the clear carbonic-acid gas is drawn off as it is produced by the fermentation, it is requisite that means shall be provided to prevent any vacuum in the suction-pipe $L^2$, as that would allow a suction of air and render the gas useless for carbonating purposes, and this object I attain by means of the devices shown in Fig. 4 and above described. As the engine operates the compressor L the clear gas is sucked through said pipe $L^2$ from the gas-supply tank F, and should this supply become practically exhausted it is desirable that the engine should stop (before the point of complete exhaustion and consequent vacuum) until a fresh supply of clear gas is led to the supply-tank F, as by the connection of another fermenting cask or casks to the pipe C. When the devices are in proper working order, the pressure in the fermentation-casks should not exceed half a pound to the square inch, which would be indicated by a height of about twelve inches of the liquid in the outer open branch of the double liquid column $T'$ over the height of the liquid in the inner branch of said double liquid column, and the pressure in said fermentation-casks should never be less than the tenth or twelfth of a pound, which whould show an excess height of the liquid in the outer branch of the liquid-indicator of between two and three inches over the height of the liquid in the inner branch thereof. The pressure within the diaphragm device $t'$ U is always the same as that in the fermentation-casks, and when this pressure is diminished from any cause the weight $w^6$ (which is adjusted on the rod $w^5$ so as to counterbalance the desired normal pressure within the diaphragm device) will operate and depress the end of the rod $w^5$, to which it is attached, and thereby close the rotary valve $w^2$ and shut off the supply of steam to the engine, and at the same time this movement of the rod $w^5$ raises the rod $w^7$ and the arm of the bell-crank lever V, to which it is attached, and forces back the other arm of the bell-crank V, and with it the connecting-rod $v$, lever $U'$, and disk U of the diaphragm device, and hence there is no vacuum in said diaphragm device, despite the reduced pressure. When the new supply of the clear gas is led from the pipe C into the gas-supply tank F, it flows through the pipes $L^2$, T, and $t$ into the diaphragm device, expanding the disk U and forcing out the lever $U'$, connecting-rod $v$, and upper arm of the bell-crank lever V, thereby depressing the lower arm of the latter, and with it the rod $w^7$ and connected end of the rod $w^5$, thus again opening the valve $w^2$ and permitting the inflow of steam to the engine from pipe W, so that the said engine will again start up and begin to operate the compressor L, which, as before, will suck the gas from pipe $L^2$ and force it through pipe $L^3$ into the reservoir E.

It is not only necessary, as just explained, to cut off the engine when the supply of clear gas abates, but it is also necessary to stop the engine when the gas is being produced in greater quantity than can be stored in the reservoir E, and this is accomplished automatically by the means shown in Fig. 4. The weight $W^4$ is adjusted on the rod $W^2$ corresponding to the desired pressure of the gas in the reservoir E, and when this pressure is exceeded the gas from pipe $L^3$, flowing into the cylinder $L^7$ through pipes $L^4$ $L^6$, will overcome the weight $W^4$ and raise the piston $L^8$ and through the link-rod $L^9$ raise the long end of rod $W^2$, depressing its short end and with it the valve-rod $w'$, thus closing the double-seat valve $w$ $w$ against its seats, thus cutting off the supply of steam from pipe W to the engine, and the latter will stop until the pressure within the reservoir E has been reduced by the withdrawal of gas therefrom, when the said weight $W^4$ will again operate and open the valve $w$ $w$ and permit steam to again enter the engine and start up the action of the engine and the compressor L. When the engine is thus stopped by the overproduction of the clear gas and the gas-collecting tank F is filled to its capacity, the surplus gas from pipe $F'$ passes through pipe $G'$ into the vessel G and out through pipe $D^3$ into pipe $D'$ and reservoir D, to be used, together with the mixed gas in said reservoir, as a compelling pressure.

Referring now to the "bunging apparatus" comprising the casks M $M'$ $M^2$, it may be explained that these casks are designed to be filled with beer immediately after the carbonation thereof by the clear purified gas. The still-beer is supplied to the carbonator Q by means of a pipe $N'$ from the source of supply through the beer-supply pump N, intermediate vessel O, filter P, and connecting-pipes, and the clear gas to be used for the carbonation passes from the reservoir E through the purifier I I and pipe I' to pipe I² and branch pipe I³ to said carbonator Q. Then the carbonated beer passes from the carbonator Q through hose Q' to the cask to be filled; each cask of the bunging-apparatus series having a beer-inlet pipe $m$ to be coupled to said hose Q' when the cask is to be filled. In Fig. 1 the middle cask M' is shown as being filled with beer from the carbonator Q. Cask M represents a cask which has been filled with carbonated beer and is ready for racking off through the final filter R and racking apparatus S, and cask M² represents a cask which has been emptied of beer. I⁴ represents a pipe connected to the described pure-gas pipe I², and said pipe I⁴ has branches I⁵ I⁵ I⁵ (preferably flexible hose) leading to the bunging-apparatus casks M M' M², each of said casks being provided with a double cock $m'$ $m^2$, the nipples of the cocks $m'$ being connected to the branch pipes or hose I⁵ just named. Before one of these casks is to be filled with the newly-carbonated beer the said cask is filled with carbonic-acid gas to force out the atmospheric air and to provide a counter pressure to prevent the foaming of the beer as it is admitted to the cask from the carbonator. I will explain the operation in connection with cask M' and state that in the beginning the first cask to be filled with beer is supplied with the mixed gas from reservoir D by any suitable connection—say, for example, by a hose extending from one of the cock-controlled nipples $k$ on pipe K² to the cock-controlled nipple $m^3$ in the lower part of the cask. From the nipple of the cock $m^2$ a hose $x$ leads to a short pipe $x'$, (provided with a pressure-gage $x^2$,) which pipe $x'$ connects with the chamber of a blow-off regulator X, suspended from which is an observation device X', similar in general construction to the observation device A', already described, and shown in Fig. 2, having a similar cap $a^6$, gas-outlet $a^7$, central depending pipe $b$, transparent wall or glass cylinder $b'$, base-plate $b^2$, clamping-rods $b^3$ $b^3$, packing $b^4$ $b^5$, and bottom outlet $b^6$, all as described with reference to the observation device A', except that the device X' is not designed to be filled with water. The blow-off regulator X is made with flexible yielding diaphragm $x^3$ across its chamber, valve $x^4$ secured to the under side of said diaphragm and seated so as to normally close the bore or passage leading to the pipe $b$ of the observation device beneath, and with a spring $x^5$ surrounding the upright rod $x^6$, projecting from the upper side of the diaphragm, the tension of which spring is adjusted according to the pressure desired by the screw-cap $x^7$, through which said rod projects, all as shown in detail in Fig. 3. From the outlet $a^7$ of said observation device X' a hose X² extends to a nipple $y$ on a pipe Y, leading back to the reservoir D. The mixed gas being admitted, as stated, through the nipple $m^3$ into the cask M' and one of the outlets of said cask—say the air-cock $m^4$—opened, the air within the cask is driven out and the cask filled with the gas, which should have a pressure of from four to six pounds, which will show on the gage $x^2$, any excess of the desired pressure serving to lift the diaphragm and valve and permit the gas to escape through the pipe $b$ and hose X² and find its way back to the reservoir D, the cock $m^4$ being closed when the air has been expelled from the cask. This described pressure of from four to six pounds within the cask is sufficient for a counter-pressure, and now the beer from the carbonator (where it is under a considerably greater pressure—say from twelve to fourteen pounds in an ordinary case, depending somewhat upon the elevation of the cask being filled above the plane of the carbonator) is admitted to the cask M' without foaming, driving out the gas through the hose $x$, blow-off regulator and observation device, hose X², and pipe Y to the reservoir D for reuse, the observation device showing when the cask is filled by the beer entering said device, so that the supply of beer may be cut off from said cask M'. The desired pressure in the carbonator Q is obtained by means of the pressure-reducer $q$ at the end of branch I³, which leads the pure gas from pipe I² to the pipe $q'$, fitted with pressure-gage $q^2$ at the point where the last-named pipe enters the carbonator.

When one of the casks of the bunging-apparatus series has been filled with the freshly-carbonated beer, as described, it is requisite that same should rest under a suitable bunging pressure for not less than ten to twelve hours before the beer is racked off. The tube $x$ is removed from the nipple of cock $m^2$ and the latter closed and hose Q' removed from the nipple $m$ of the cask and then pure gas admitted by opening cock $m'$ of the cask and the cock $i$ in pipe I², said cock $i$ being adjacent to the pressure-gage $i'$ and pressure-reducer $i^2$ and the gas at the desired reduced pressure—say from ten to twelve pounds—flowing into pipe I⁴ and through hose I⁵ upon the beer in the filled cask. When the beer has been kept the desired length of time under this bunging pressure, the supply of pure gas is cut off by closing the cock $m'$, and the mixed gas from pipe K² is utilized as a compelling pressure in racking off the beer, as will be now explained in connection with cask M. (Shown in Fig. 1.) A hose I⁶ is connected to the nipple $k$ and to the nipple of cock $m^2$, and a hose R' is connected to the nipple $m$ of the cask, the other end of said hose being coupled to the inlet-pipe of the final filter R, from which a pipe or hose S' leads to the racking apparatus S.

K³ is a branch pipe leading from pipe K' to a reservoir S², there being a pressure-reducing valve $z$ at the end of said branch pipe and a pressure-gage $z'$ on said reservoir, and from the latter there extend hose S³, leading to the valved extensions of the filling-bungs S⁴. S⁵ is a foam-indicator with which the hose S' from the filter R is connected and from which foam-indicator the hose $S^6$ lead to said valved extensions of the filling-bungs.

Each filling-bung $S^4$ is in the form of a hollow tapered cylinder, having a filling-tube $S^9$ of reduced diameter within the same and projecting downward therefrom, and the annular space between shell and tube communicates with a tubular handle $z^2$, which has a vent-cock $z^3$ and a hose $S^7$ leading to a reservoir $S^8$, which is provided with a pressure-gage $z^4$ and blow-off valve $z^5$, there being an observation-glass $z^6$ in said hose $S^7$ just above the tubular handle $z^2$. The hose $S^6$ has a cock $z^7$, the hose $S^3$ a cock $z^8$, and the hose $S^7$ a cock $z^9$.

Z Z represent the shipping-casks to be filled with beer from the bunging-apparatus casks, and I will describe filling one of these casks from the cask M. It is necessary to have a counter-pressure in the said cask Z to prevent foaming, and for this purpose the mixed gas from pipe K' is led into the reservoir $S^2$ at a reduced pressure of, say, three or four pounds. The filling-bung $S^4$ is inserted within the bunghole of the cask Z and the cock $z^8$ opened, (the cocks $z^7$ $z^9$ being closed,) and then the mixed gas from the reservoir $S^2$ flows through hose $S^3$ and the filling-tube $S^9$ into the cask to constitute the required counter-pressure.

The beer from the cask M is forced by the compelling pressure of the mixed gas in pipe $K^2$, through the pipe R' into the filter R, (the cocks $k'$ and $m^2$ being opened to admit this gas through hose $I^6$ to the beer in cask M,) and from the filter R the beer passes through hose S', foam-indicator $S^5$, and hose $S^6$, the cocks $z^7$ and $z^9$ being opened and the cock $z^8$ being closed before the cocks in the hose R' and S' are opened to admit the passage of the beer. As the beer enters the shipping-cask Z through the tube $S^9$ near the bottom of the cask the gas and whatever air there may be in said cask escapes out through the described annular passage between the shell and tube of the filling-bung $S^4$ and through the tubular handle $z^2$ and hose $S^7$ into the reservoir $S^8$, and as soon as the observation-glass $z^6$ shows any beer or foam therein the cock $z^7$ is closed to shut off the supply of beer, and the vent-cock $z^3$ is opened to relieve any overpressure in the filling-bung and drain off any beer in the tube $S^7$, and the cock $z^9$ is then closed, when the filling-bung may be removed from the cask Z and the latter promptly bunged. Any excess of pressure in the reservoir $S^8$ will escape through the blow-off valve $z^5$, and the amount of beer that escapes when the vent-cock $z^3$ is opened is inconsiderable. The filling-bung may now be transferred to another shipping-cask and the racking-off operation repeated until the storage-cask from which the beer is supplied is emptied, and in Fig. 1 I have shown the racking apparatus S adapted to operate with two shipping-casks simultaneously, and as a matter of fact this may be arranged for any number found convenient, as illustrated in my Patent No. 623,758, dated April 25, 1899.

When one of the casks of the bunging apparatus has been emptied of beer in the manner just described, the hose R' is detached from the nipple $m$ of said cask (to be attached to another cask ready to be racked off) and the cask from which the beer has just been withdrawn remains filled with the mixed gas from the compelling-pressure system at a pressure of, say, about twelve to fourteen pounds, and I utilize this gas for the counter-pressure in a new cask which is to be filled with beer by connecting a hose $M^3$ to the nipple $m^3$ of the just beer-emptied cask and to the like nipple of the new cask, so that the latter may be supplied with gas from the said beer-emptied cask, which will result in the new cask being filled with gas at the required pressure necessary for a counter-pressure before filling with beer, this new cask being first connected up with the already-described hose $x$, regulator X, observation device X', and hose $X^2$, leading to the pipe Y, and then after the said new cask has been filled with gas at the desired pressure the said hose $M^3$ is disconnected from the nipple of said new cask and connected to another nipple $y$ on said pipe Y, (still being connected to the emptied cask,) so that all excess of gas from the new cask and all the gas from the lately-emptied cask may be led back to the reservoir D for reuse, after which the new cask is filled with beer from the carbonator in the manner already described, while the lately-emptied cask is disconnected and thoroughly cleaned for future use.

There never should be more than about one-half-pound pressure upon the wort in the fermenting-cask, and it has been already stated that the vessel G has been provided as a safety and overpressure device for the clear gas led from said cask A by pipes $c$, C, and F' to the gas-supply tank F. If it were not for this vessel G, when the tank F was filled to its capacity the pressure in the cask A would increase and retard the fermentation. The column of water within the vessel G is about twelve inches in height, which will control the pressure of one-half pound in the fermenting-cask, serving as a counter-pressure regulator, the gas being admitted to the bottom of the vessel G by pipe G' and passing through said water-column and out by pipe $D^3$ to pipe D' and into reservoir D. Hence by my present device I not only prevent the retardation of the fermentation, but I also save this excess of gas withdrawn from the cask A and store it up for use as a compelling pressure.

The object of employing the hereinbefore-referred-to intermediate beer-supply vessel O between the pump N and the first filter P is to secure a steady pressure upon the beer in the filter and keep the pressure in said filter P and carbonator Q practically constant, and by connecting branch pipe O' to the pipe K' and to the pressure-reducing valve O² on said vessel O, I utilize the mixed gas from the reservoir D to maintain the required pressure on the beer within said vessel O, which is provided with a pressure-gage O³ and blow-off regulator O⁴ to accomplish this purpose.

I have not deemed it necessary to specifically describe the construction and attachments of the pipe N² from pump N to vessel O, the pipe P' from said vessel to filter P, the pipe P² from said filter to the carbonator Q, nor the observation devices and cocks shown thereon, nor the specific construction of filter R and its pipes, cocks, and attachments, as the same have no especial reference to my hereinbefore-described system for the collection, utilization, and reuse of the gas from the fermenting vessel, but have shown said parts so that my entire system may be clearly illustrated.

As it is desirable that the gas, both that used as a compelling pressure and that employed for carbonation, should be as dry and free from moisture as possible, I provide means for draining the pipes where required—as, for example, the drip-pipes K² and i³ on the pipe K² and I⁴ and the waste-cock f in the gas-supply tank F, as the latter receives more or less moisture from condensation in the pipes leading thereto.

The reservoir D contains the mixed gas free from pressure, the pipe D⁴ being always open to the open air and said pipe being usually extended to the height of the building in which the reservoir is located, and the gravity-indicator d shows the condition of the contents of the said reservoir. If the reservoir is full of gas and the pipe D⁴ is, say, sixty feet in height, then the outer column of the indicator d (which is open to the air) will show an excess of height of the liquid therein contained of from three-fourths of an inch to an inch over the height of the liquid in the inner column next the pipe d', and the variation of height from time to time will indicate the relative amount of gas and air in said reservoir D, and if the latter has been emptied of gas by the suction of the pump H then the liquid in the two columns of the indicator d will be of equal height.

As already stated, there may be any desired number of the fermenting vessels A, and therefore some of these vessels may be connected to the collecting-pipe B for the withdrawal of the mixed gas, while others at the same time are connected to the collecting-pipe C for the clear gas, and hence all the parts of my system may be in continuous use at the same time, and the engine which operates the compressor L is designed to have two steam-cylinders; but I have not deemed it essential to show the construction of the engine in the drawings.

Having thus described my invention, what I claim as new, and desire to secure by Letters Patent, is—

1. The combination with a closed fermenting vessel, of a gas-outflow pipe connected to the upper part thereof, and formed with a valve-casing having a valve operative therein, and said valve-casing being provided with an outlet in its bottom; a transparent observation device suspended from said valve-casing, and having a gas-outlet at its upper end, and a central depending pipe communicating with the outlet in the bottom of said valve-casing; a gas-collecting pipe, provided with a valve-controlled inlet-pipe, and a hose leading to said inlet-pipe from the gas-outlet of the said transparent observation device, the latter containing a water-column between its central depending pipe and transparent wall, whereby the outflow of gas from the said fermenting vessel may be observed during the process of fermentation from the beginning and during the various stages and the cessation thereof.

2. The combination with a closed fermenting vessel, of a gas-outflow pipe connected to the upper part thereof, a depending pipe suspended from and communicating with said gas-outflow pipe, a gas-collecting device, and a transparent observation device also suspended from said outflow-pipe and surrounding said depending pipe, and provided with a water-column through which the gas produced by the fermentation must pass on its way to said collecting device.

3. The combination with a gas-outflow pipe formed with a valve-casing and having a valve operative therein, of a bushing secured to the bottom of said casing, a coupling suspended from said bushing, a cap suspended from said coupling and provided with a laterally-extended gas-outlet pipe and a central depending pipe in line with the bore of said bushing, a base-plate provided with a valve-controlled liquid-outlet, a transparent wall surrounding said central depending pipe between the cap and base-plate, clamping-rods extending between the said cap and base-plate, and suitable packing rendering the joints gas and liquid tight.

4. The combination with a closed fermenting vessel, and a valve-controlled gas-outflow pipe connected to the upper part thereof, of a reservoir for the collection and storage of the mixed gas and air first led from the fermenting vessel; an open pipe leading upward from said reservoir to the open air; a pair of gas-collecting pipes, provided with valve-controlled gas-inlets; a hose for connecting the gas-outflow pipe with the gas-inlet of either of said gas-collecting pipes; a gas-supply tank for the collection of the clear gas from the fermenting vessel; an independent safety and overpressure vessel containing a water-column maintained at a constant height; a pipe leading from one of the gas-collecting pipes directly to said reservoir; another pipe, leading from the other of said gas-collecting pipes to the gas-supply tank; a valve-controlled gas-outlet pipe on the gas-supply tank below the plane of said gas-leading pipe; a branch from said gas-leading pipe extending to the lower part of said safety and overpressure vessel; a branch pipe leading from said vessel to the pipe leading to the reservoir, and another branch pipe leading from said gas-supply tank, above the plane of the gas-leading pipe therein, to the said pipe leading to said reservoir.

5. The combination with a reservoir for containing mixed gas and air, of a pump and purifier connected thereto, and a pipe leading from said purifier; a vessel to be filled with beer; a hose connecting said pipe with said vessel to supply a counter-pressure of gas from said reservoir preliminary to the admission of beer; a hose leading to said vessel from a supply of beer under pressure; a cock-controlled gas-outlet in said vessel; a hose leading from said outlet; a blow-off regulator connected to said hose; an observation device connected to said blow-off regulator to indicate when the vessel has been filled with beer, and hose and pipe connections leading from said observation device back to said reservoir, whereby the gas originally introduced into said vessel from said reservoir is led back thereto for reuse, as the beer is admitted to said vessel.

6. The combination with a closed fermenting vessel, a gas-outflow pipe connected to the upper part thereof and a gas-collecting pipe connected to said gas-outflow pipe, of a gas-supply tank and a pipe leading thereto from the gas-collecting pipe; a gas-compressor, and a pipe leading thereto from the gas-supply tank; a reservoir for the compressed gas, and a pipe leading thereto from the compressor; a steam-engine for operating said compressor; a steam-passage leading to the steam-chests of said engine; a rotary valve located in said steam-passage and having a valve-rod projecting through the casing thereof and carrying a block at its outer end; a transverse rod connected to said block; an adjustable weight on one end of said transverse rod; a bell-crank lever pivotally supported on the casing of the steam-passage; a link pivotally connecting one arm of said bell-crank lever with the adjacent end of the said transverse rod; a diaphragm device comprising a rigid concave shell and a yielding flexible disk; a pipe leading from the pipe between the gas-supply tank and the compressor, and having a branch leading into the said diaphragm device; a lever linked at one end to the diaphragm-shell and also linked to the flexible disk thereof; and a connecting-rod pivotally connected to the other end of said lever and to the other arm of the said bell-crank lever.

7. In apparatus for collecting and utilizing carbonic-acid gas produced by fermentation in breweries, the combination with a closed fermenting vessel, two receptacles, a purifier, a carbonator, a cask, and a vessel containing a supply of still beer, of means for leading the first-produced mixed gas and air in the closed fermenting vessel to the first receptacle; means for leading the clear gas next produced in the said closed fermenting vessel to the second receptacle; means for leading the mixed gas and air from said first receptacle, through said purifier, to said cask, for driving out the air therefrom, and to form a counter-pressure therein; means for leading the supply of still beer, from the said vessel containing the same, to said carbonator; means for leading the clear gas from said second receptacle, under desired pressure, to said carbonator; means for leading the beer thereby carbonated from said carbonator to said cask to be filled against the counter-pressure of the mixed gas and air therein contained; and means for leading said mixed gas and air back to said first receptacle, as it is driven out of said cask by the admission of the carbonated beer.

8. In apparatus for collecting and utilizing carbonic-acid gas produced by fermentation in breweries, the combination with a fermenting vessel containing said gas, of a receptacle; means for leading said gas to said receptacle; a resting-cask containing carbonated beer; a filter, racking apparatus, and storage-casks, all connected to said resting-cask; means for leading the gas from said receptacle to said resting-cask for driving out the carbonated beer to said storage-casks until said resting-cask is emptied of the beer and filled with the gas, an additional cask for the reception of carbonated beer; means for leading the gas from said resting-cask to said additional cask to be used as a counter-pressure; and means for leading the remaining gas in the resting-cask back to the said receptacle for future use.

In testimony that I claim the foregoing I have hereunto set my hand, at Milwaukee, in the county of Milwaukee and State of Wisconsin, in the presence of two witnesses.

OTTO ZWIETUSCH.

Witnesses:
    H. G. UNDERWOOD,
    N. E. OLIPHANT.